2,889,374
Patented June 2, 1959

2,889,374

PROCESS FOR PRODUCING AQUEOUS TRI-METHYLOLPHENOL SOLUTIONS

Cal Y. Meyers, Princeton, N.J., assignor to Union Carbide Corporation, a corporation of New York No Drawing. Application February 15, 1957
Serial No. 640,351

11 Claims. (Cl. 260—621)

This invention relates to a process for producing aqueous trimethylolphenol solutions. More particularly, this invention relates to a process for producing aqueous solutions of trimethylolphenol from calcium and barium salts of trimethylolphenol.

As used herein, the term "trimethylolphenol" signifies the compound 2,4,6-trimethylolphenol, which compound may be represented by the graphic formula

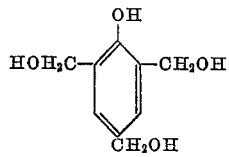

Trimethylolphenol is a useful water-soluble, resin-forming compound having a melting point of about 84–86° C., which is suitable for use in many applications, particularly as a component of phenolic resin compositions. The phenolic resins formed from polyhydroxy compositions and trimethylolphenol are particularly desirable in that they can be prepared under aqueous polymerization techniques and are readily applied from aqueous solutions or dispersions. Aqueous solutions containing dissolved trimethylolphenol as well as a dissolved polyhydroxy compound as glycols, polyglycols, polysaccharides, and polyhydroxy resins such as polyvinyl alcohol and the like are particularly useful as sealers for porous boards and tiles. Curing of such resinous products is conveniently accomplished by the application of heat or the use of an acidic catalyst or both.

Homopolymers of trimethylolphenol can also be prepared under conditions similar to the preparation of the polyhydroxy-trimethylolphenol condensates. Because of the water solubility of the trimethylolphenol, the homopolymers can be produced under aqueous polymerization techniques. Such homopolymers are useful by virtue of their properties, particularly their application from aqueous solutions and the insolubility and infusibility of the homopolymer after curing. Concentrated aqueous solutions of trimethylolphenol have been found to be useful in mineral wool and fiber bonding applications, and particularly as binders for glass fiber batts and mats. In addition they serve very efficiently as paper beater addition products and as first coat resins for the preparation of electrical-grade paper laminates.

One of the principal difficulties heretofore of obtaining trimethylolphenol in pure form has been its extreme ease of self-condensing and polymerization. Under even mildly acidic conditions the trimethylolphenol will self-condense and otherwise be unusable. Heretofore preparation of the pure trimethylolphenol has been accomplished only through extended and expensive methods of preparation and adaptable only for the recovery of crystalline products.

Hunter, J. Appl. Chem. 1, 217 (1951) reports that he was able to secure trimethylolphenol by the reduction of acetoxytrimesic acid triethyl ester with lithium aluminum hydride. Freeman, J. Am. Chem. Soc., 74, 6257 (1952) was likewise able to secure trimethylolphenol by the neutralization of sodium trimethylolphenate with acetic acid in a dilute suspension in acetone. In this process Freeman reported a yield of trimethylolphenol of 71 percent but of an obviously impure product (M.P. 74–75° C.). In addition, Freeman notes that in his process the trimethylolphenol was not always recoverable in crystalline form, but was quite often secured only as a viscous oily product. In addition, he has found it impossible to further purify the trimethylolphenol without resinification. Martin, J. Am. Chem. Soc. 74, 3024 (1952) was able to secure a crystalline product believed to be nearly pure anhydrous trimethylolphenol (melting point 84° C.) starting with phenol and formaldehyde. A mixture of polymethylolphenols formed in the reaction of the phenol and formaldehyde were converted to the trimethylolsilyl derivatives with trimethylchlorosilane which subsequently were separated into their respective silyl derivatives by fractionation and each fraction then hydrolyzed. From one fraction Martin was able to isolate crystalline trimethylolphenol having a melting point of 84° C. in an unspecified yield after a recrystallization from ethyl acetate. It is obvious that such processes are entirely too cumbersome and expensive in preparing trimethylolphenol suitable for commercial use or to justify commercial exploitation. Heretofore, there has been no method to economically produce usable solutions of trimethylolphenol other than by dissolving the crystalline trimethylolphenol in water.

It is therefore an object of the present invention to provide a process for the direct production of usable aqueous solutions of trimethylolphenol in high yields and excellent purity in an inexpensive and simplified process rather than trying to produce a crystalline trimethylolphenol which ultimately will be dissolved in water for aqueous polymerization techniques, and thus will avoid some of the difficulties encountered heretofore.

I have now discovered that directly polymerizable aqueous solutions of trimethylolphenol can be prepared in a simplified process by neutralizing an aqueous solution of the calcium or barium salt of trimethylolphenol with an acid or acid anhydride which forms a water-insoluble calcium or barium salt. My process is particularly desirable in that directly polymerizable solutions of trimethylolphenol can be prepared starting either from the calcium or barium salts of trimethylolphenol or from aqueous solutions of such salts prepared directly from phenol and formaldehyde without ever having to remove these salts from the solution or isolate the trimethylolphenol from the solution. This process not only eliminates the need for organic solvents in the process for making trimethylolphenol, but also eliminates several costly, troublesome and yield-reducing operations as precipitation, crystallization, and filtration, and the drying of reactants, precipitants and products. Thus, with such a process, better yields of the costly trimethylolphenol are secured in high purity and in directly usable condition.

The acidic compounds I have found suitable for use in neutralizing the calcium or barium trimethylolphenate solution are those forming substantially water-insoluble calcium or barium salt at the neutralized conditions, i.e. at a pH of between about 5 and 8. These acids include inorganic mineral acids as sulfuric, phosphoric, boric, and organic acids as oxalic, citric, ascorbic, and carbonic acids. It is sometimes desirable in this process to employ acid anhydrides of these acids, and particularly carbon dioxide which, under the aqueous reaction conditions, form the the appropriate neutralizing acid, in situ.

The acids employed herein serve effectively in several capacities. Primarily the acid serves to neutralize the calcium or barium trimethylolphenate to trimethylolphenol and secondarily, but of equal importance, it forms highly water insoluble calcium or barium salt during the neutralization reaction and permits the recovery of the trimethylolphenol in solution uncontaminated with such materials.

The use of carbon dioxide in this process is particularly desirable. It can be employed in this process in either form, viz. either as a gas or a solid. I have found that the amount of carbon dioxide employed in the process is not narrowly critical since the neutral end-point is nearly impossible to exceed, which would otherwise drive the pH of the solution low enough to cause the trimethylolphenol to polymerize. However, the carbon dioxide should be added in amounts of at least sufficient to make the reaction solution substantially neutral, preferably at pH of between about 5 to 8 by the addition of at least equivalent amounts to the calcium or barium trimethylolphenate. Neutralization with other acids and anhydrides must be more carefully controlled to avoid exceeding the neutral end point. This is easily avoided by the use of equivalent amounts of acid.

Temperature of the reaction during the neutralization should preferably be maintained below about 65° C and more preferably below 55° C. Temperatures as low as 0° C. or lower can be used if desired if the reaction can be maintained in the liquid phase.

As one method of carrying out the process of this invention, the calcium or barium trimethylolphenate is dissolved in water sufficient to make a mixable solution and the carbon dioxide bubbled into the solution through a suitable gas disperser if gas is used, or added in the solid form, as Dry Ice, until the solution is substantially neutral.

As another embodiment of this invention, the aqueous solution of the calcium or barium salt of trimethylolphenol can be neutralized by adding either concentrated or dilute aqueous solutions of acid capable of producing the water-insoluble calcium or barium salt. Preferably, the acid is slowly added to the neutral end point of a pH of 5–8 to avoid excessive acidity which could cause polymerization of the trimethylolphenol and subsequent low yields.

The calcium or barium trimethylolphenate employed in this process can be produced starting from phenol and formaldehyde without isolating the calcium or barium trimethylolphenate, and thereby saving on process costs and handling and producing the aqueous trimethylolphenol solutions.

The amount of water initially present is not critical as long as a mixable solution results. Preferably the amount of water is adjusted according to the concentration of trimethylolphenol desired in the finished solution. However, the resultant solution can be diluted with additional water or concentrated as desired. Concentration is preferably performed under reduced pressures at temperatures not exceeding about 50° C. to avoid self-condensation of the trimethylolphenol. When anhydrides as $CO_2$, $SO_3$, $P_2O_5$, etc. are used, at least equivalent amounts of water to form the acid should be used. For best results, water should be present in amounts of about 15 to 30 parts of water per 100 parts of calcium or barium trimethylolphenate to permit the easy removal of the insoluble calcium or barium salt produced in the neutralization. Solutions containing over about 80 percent by weight of trimethylolphenol are not desirable inasmuch as they are so viscous as to make handling and transfer operations awkard and wasteful.

The pH of the reaction mixture can be followed with indicators, pH meters or other suitable methods. Gravimetric methods, vis. adding stoichiometric amounts of the acid or anhydride are also suitable. Excess acidity if encountered, can be neutralized with a suitable acid acceptor, for instance, calcium or barium oxide, hydroxide, carbonate, or the like which will precipitate out the calcium or barium salt, or more preferably by adding amounts of the aqueous solution of the calcium or barium salt of trimethylolphenol. The insoluble salt formed in the reaction is then conveniently removed by filtration, decantation, or centrifugation of the neutralized solution. With careful control of the neutralization and salt removal, the aqueous solution of trimethylolphenol will be recovered uncontaminated with polymeric by-products or mineral salts. This solution can then be used directly for polymerization reactions. The solution may be concentrated or diluted as hereinbefore described and can, if desired, be stored, preferably under refrigeration without deleterious effects without the use of polymerization inhibitors.

The 2,4,6-trimethylolphenol solutions produced herein are secured in high yields and high purity. Generally yields of better than 90 percent of theoretical are achieved, with the trimethylolphenol having a purity of about 95 percent or better.

The following examples are illustrative.

*Example 1*

A mixture consisting of 940 grams (10 moles) phenol, 450 grams (15 moles) paraformaldehyde and 1215 grams (15 moles) of 37 percent aqueous formaldehyde was cooled to 10–15° C. with an ice bath and 280 grams (5 moles) of reagent grade calcium oxide was added at such a rate that the reaction mass temperature did not exceed 30° C. Agitation was continued for two hours, 500 ml. of water was added and the mixture agitated 15 more hours at room temperature. The solution, which was entirely clear and homogeneous at this point, was re-cooled to below 20° C. then neutralized by slowly adding a solution consisting of 490 grams (5 moles) $H_2SO_4$ in 500 ml. of water. The temperature of the reaction mixture was maintained below 30° C. during this addition. The pH at this point was 5–6. The calcium sulfate was filtered off and washed with water. The filtrates were combined and vacuum concentrated (pressure 5–10 mm.) at room temperature to a final weight of 2125 grams. The amber-colored, moderately viscous solution so obtained about 25 percent water (by Karl Fischer Titration) and about 75 percent trimethylolphenol.

The quality of the produce of this example was verified in the following manner. A 5 gram sample was brought to pH 10 by the careful addition of 50 percent aqueous sodium hydroxide. To this solution was added, with agitation, 10 ml. of methanol, then 30 ml. of isopropyl alcohol, then 100 ml. of acetone. The white precipitate which formed was collected, washed with acetone and dried for one hour at room temperature in a vacuum desiccator over paraffin and sodium hydroxide pellets. It contained 8.0 percent moisture (Karl Fischer Titration) and had a neutralization equivalent (titration, in triplicate, with 0.1 N HCl to a bromphenol blue endpoint) of 226. Calculated for sodium trimethylolphenate monohydrate: 8.0 percent moisture and 224 neutralization equivalent.

*Example 2*

A mixture consisting of 188 grams (2 moles) of phenol, 324 grams (4 moles) of 37 percent aqueous formalin, and 90 grams (3 moles) of paraformaldehyde was cooled in an ice bath to 15° C. and 56 grams (1 mole) of reagent grade lime, taken from a newly opened bottle, was added to the mixture with vigorous agitation at such a rate that the reaction mass temperature remained below 35° C. throughout. After two hours of agitation, 200 ml. of water was added, the ice bath was removed and agitation was continued for an additional 14 hours during which period the reaction temperature remained at 25–30° C. without external cooling. The reaction mixture was poured slowly into 2.5 liters of a vigorously agitated 2:1 (by volume) acetone-isopropanol solution. The white precipitate which formed was allowed to settle for two hours, then collected on a Buchner funnel and the solvents completely expressed therefrom by means of a rubber dam. The filter cake was desiccated for several hours in a vacuum desiccator over sodium hydroxide pellets and paraffin at room temperature, then comminuted. There was so obtained 362 grams (89 percent yield) of a fine, white powder which was readily soluble in water, slightly soluble in methanol and ethanol, very slightly soluble in isopropanol and insoluble in acetone. It had a neutralization equivalent of 204 (average of 4 determinations) as determined by titration with hydrochloric acid to a bromphenol blue endpoint. (Calculated for calcium trimethylolphenate: 203).

*Example 3*

4.0 grams (0.00975 mole) of pure, dry calcium trimethylolphenate was dissolved in 100 ml. of water and solid carbon dioxide (crushed "Dry-Ice") was added, with agitation, until the pH of the reaction mixture remained at 5–6 for 10 minutes. The calcium carbonate was isolated by filtration, washed with acetone, then oven-dried at 80° C. for 15 minutes. There was so obtained 0.975 gram of calcium carbonate, corresponding to 92 percent of theory.

The aqueous filtrate was a solution containing good quality trimethylolphenol as reflected by the neutralization equivalent of the sodium trimethylolphenate monohydrate prepared therefrom being about 224 as determined by the method of the first example.

I claim:

1. A process for the preparation of directly polymerizable solutions of 2,4,6-trimethylolphenol substantially free of resinous by-products and mineral salts which includes the step of adding to an aqueous solution consisting of water and a member selected from the group consisting of calcium 2,4,6-trimethylolphenate and barium 2,4,6-trimethylolphenate maintained at a temperature between about 0° C. and about 65° C., an amount of an acidic material selected from the class consisting of sulfuric acid, phosphoric acid, boric acid, oxalic acid, citric acid, ascorbic acid, carbonic acid and the acid anhydrides thereof to form a substantially water-insoluble salt of the metal ion of the trimethylolphenate compound, said amount being that necessary to adjust the pH of said solution to between 5 and 8, and thereafter removing the water-insoluble salt of the metal ion of the trimethylolphenate compound formed.

2. A process according to claim 1 wherein the acidic material is carbonic acid.

3. A process according to claim 1 wherein the acidic material is sulfuric acid.

4. A process according to claim 1 wherein the said member is calcium 2,4,6-trimethylolphenate.

5. A process according to claim 1 wherein the said member is barium 2,4,6-trimethylolphenate.

6. A process for the preparation of directly polymerizable solutions of 2,4,6-trimethylolphenol of a purity of at least about 95 percent and being substantially free of resinous by-products and mineral salts which includes the steps of slowly adding to a solution consisting of a member selected from the group consisting of calcium 2,4,6-trimethylolphenate and barium 2,4,6-trimethylolphenate and water in amounts of between about 15 to 30 parts of water per 100 parts of said trimethylolphenate maintained at a temperature between about 0° C. and 65° C., an amount of an acidic material selected from the class consisting of sulfuric acid, phosphoric acid, boric acid, oxalic acid, citric acid, ascorbic acid, carbonic acid and the acid anhydrides thereof to form a substantially water-insoluble salt with substantially all of the metal ion of the trimethylolphenate compound, said amount being that necessary to adjust the pH of the mixture to between 5 and 8, and thereafter removing the water-insoluble salt of the metal ion of the trimethylolphenate compound from the resulting mixture.

7. A process according to claim 6 wherein the acidic material is sulfuric acid.

8. A process according to claim 6 wherein the acidic material is carbonic acid.

9. A process for the preparation of directly polymerizable solutions of 2,4,6-trimethylolphenol of a purity of at least about 95 percent and being substantially free of resinous by-products and mineral salts which includes the steps of adding carbon dioxide to a solution consisting essentiall of water and a member selected from the group consisting of calcium 2,4,6-trimethylolphenate and barium 2,4,6-trimethylolphenate at a temperature between about 0° C. and 65° C., in an amount sufficient to adjust the pH of the solution to between 5 and 8, forming the carbonate salt of the metal ion of the trimethylolphenate compound and thereafter removing the carbonate salt from the said mixture.

10. A process according to claim 9 wherein the said member is calcium 2,4,6-trimethylolphenate.

11. A process according to claim 9 wherein the said member is barium 2,4,6-trimethylolphenate.

References Cited in the file of this patent

UNITED STATES PATENTS 2,579,329    Martin _____ Dec. 18, 1951

FOREIGN PATENTS 558,987    Great Britain _____ Jan. 31, 1944

OTHER REFERENCES

Martin: Jour. Amer. Chem. Soc., vol. 73 (1951), pp. 3952–54 (3 pp.).